United States Patent
Steinmueller et al.

(10) Patent No.: US 8,985,494 B2
(45) Date of Patent: Mar. 24, 2015

(54) BRAKING SYSTEM FOR A CABLE ROLLER

(75) Inventors: Joerg Steinmueller, Meinerzhagen (DE); Guenter Kleindopp, Herscheid (DE); Martin Glomb, Schwelm (DE); Lei Zhang, Shanghai (CN)

(73) Assignees: ATHOS Holding GmbH, Luedenscheid (DE); Taicang Athos Electrical Components Co., Ltd., Taicang, Jiangsu (CN)

( * ) Notice: Subject to any disclaimer, the term of this patent is extended or adjusted under 35 U.S.C. 154(b) by 137 days.

(21) Appl. No.: 13/823,886

(22) PCT Filed: Dec. 15, 2011

(86) PCT No.: PCT/EP2011/072920
§ 371 (c)(1),
(2), (4) Date: Mar. 15, 2013

(87) PCT Pub. No.: WO2012/080401
PCT Pub. Date: Jun. 21, 2012

(65) Prior Publication Data
US 2013/0175381 A1    Jul. 11, 2013

(30) Foreign Application Priority Data

Dec. 17, 2010   (CN) .......................... 2010 2 0668375
Aug. 26, 2011   (CN) .......................... 2011 1 0270914

(51) Int. Cl.
*B65H 75/30*   (2006.01)
*B65H 75/44*   (2006.01)
(Continued)

(52) U.S. Cl.
CPC .............. *B65H 75/4418* (2013.01); *A47L 9/26* (2013.01); *B65H 75/4431* (2013.01); *B65H 75/4447* (2013.01); *B65H 75/48* (2013.01); *B65H 2701/34* (2013.01)
USPC ...................................... 242/396.5; 242/396.6

(58) Field of Classification Search
USPC ......... 242/396, 396.5–396.6; 191/12.2 R, 12.4
See application file for complete search history.

(56) References Cited

U.S. PATENT DOCUMENTS

| 6,179,104 | B1 |  | 1/2001 | Steinmüller et al. |
| 6,904,872 | B2 | * | 6/2005 | Muller .......................... 119/796 |
| 6,942,078 | B2 | * | 9/2005 | Hamm et al. ............ 191/12.2 R |

FOREIGN PATENT DOCUMENTS

| CN | 2665092 Y | 12/2004 |
| CN | 1937332 A | 3/2007 |

(Continued)

OTHER PUBLICATIONS

International Search Report of PCT/EP2011/072920, date of mailing Mar. 28, 2012.

*Primary Examiner* — Sang Kim
(74) *Attorney, Agent, or Firm* — Collard & Roe, P.C.

(57) ABSTRACT

The invention relates to a cable drum for automatically winding up a cable having an inner drum part (2), an outer drum part (1) and a back panel (3). The inner drum part (2) is connected to a hollow cylindrical link (23), whose inner wall has at least one vaulting (24), wherein a brake lever (6) is mounted in a radially moveable manner to the back panel (3), having at least one slot hole (63), in which the axis (71) of a brake wheel (7) is guided, which protrudes into the link (23) and abuts on its inner wall, wherein the at least one slot hole (63) is positioned angularly in a way that the brake wheel (7) during rotation of the link (23) is pressed against the inner wall of the link in winding direction of the cable drum and wherein a locking element is arranged at the brake lever (6) downstream of the brake wheel (7) in winding direction of the cable drum, which interacts with at least one tuck bar arranged at the inner drum part (2) in a manner that it is only locked when passing the tuck bar in winding direction of the cable drum.

10 Claims, 8 Drawing Sheets

(51) Int. Cl.
*A47L 9/26* (2006.01)
*B65H 75/48* (2006.01)

(56) References Cited

FOREIGN PATENT DOCUMENTS

| CN | 201038695 Y | 3/2008 |
| CN | 201045110 Y | 4/2008 |
| CN | 201140957 Y | 10/2008 |
| CN | 202245570 U | 5/2012 |
| DE | 10 2006 03058 | 1/2008 |
| EP | 0 966 083 | 12/1999 |
| EP | 1 714 932 | 10/2006 |
| EP | 2 539 265 B1 | 2/2014 |
| FR | 2 764 181 | 12/1998 |
| GB | 2467953 A | 8/2010 |

\* cited by examiner

BRAKING SYSTEM FOR A CABLE ROLLER

CROSS REFERENCE TO RELATED APPLICATIONS

This application is the National Stage of PCT/EP2011/072920 filed on Dec. 15, 2011, which claims priority under 35 U.S.C. §119 of Chinese Application Nos. 201020668375.2 filed on Dec. 17, 2010, and 201110270914.6 filed on Aug. 26, 2011, the disclosure of which is incorporated by reference. The international application under PCT article 21(2) was not published in English.

BACKGROUND OF THE INVENTION

1. Field of the Invention

The invention relates to a cable roller for automatically winding up a cable.

2. The Prior Art

For household and workshop appliances, e.g. vacuum cleaners, there is provided a cable roller for automatically winding up a cable in order to store electric cables which are only required temporarily or in varying lengths. These cable rollers are provided with a braking system, which prevents a cable section unwound from the cable roller from being immediately wound up automatically. Such braking systems can be sub-divided into two principles. Firstly, brake lever systems are known which prevent the cable from being unintentionally wound up automatically with a rubber element by means of friction. With these systems it is disadvantageous that they are sensitive to external influences such as high temperatures or greasing, which is why these systems are error-prone. Furthermore, braking devices are known where latching elements are directed via a slotted guide track against a stopper in order to prevent the cable from automatically winding up. With these braking systems it is disadvantageous that due to the strong forces of the return spring when the latching element strikes, deformations may occur.

SUMMARY OF THE INVENTION

The invention is intended to remedy this. The invention is based on the task to create a cable roller for automatically winding up a cable having a braking system which is dependable and which prevents high rebound forces. According to the invention, this problem is solved by the features described herein.

The invention provides a cable roller for automatically winding up a cable having a braking system which is dependable and which prevents high rebound forces. The brake wheel guided in the slot hole of the brake lever is pressed against the link when the cable roller rotates in the winding direction, whereby deceleration is effected. The brake forces are thus significantly increased as soon as the brake wheel engages with the vaulting of the inner walls of the link. Normally, a complete deceleration of the cable roller occurs in this position. In the case where the friction coefficient between the brake wheel preferably made from rubber and the link is reduced e.g. by penetrating fats, it is possible that the brake wheel slides out of the vaulting. In this case the locking element which is downstream from the brake lever interacts with the tuck bar arranged at the drum part, whereby the cable roller is locked. This locking is effected due to the previous deceleration by the brake wheel under low forces in order to avoid heavy blows. The two-step design of the brake system is essential to the invention, by means of which the dependability is increased. By means of the downstream locking element unintentional automatic winding-up of the cable is impossible.

The invention further relates to the vaulting having a rectangular cross-section. Thus the braking action of the brake wheel is increased. Alternatively, the vaulting may have at least partially a sawtooth-shaped cross-section.

In a further embodiment of the invention the locking element is formed by an edge arranged at the end of the brake lever, wherein the at least one tuck bar is formed by a wedge connected to an annular bar arranged at the inner drum part concentrically to the link. The locking is effected by the edge striking against the projection of the wedge when the cable roller rotates in the winding direction.

In a further embodiment of the invention the wedge is provided with a stop element at its end, which is angular at the outer face facing the annular bar. Thus, a soft gliding over the wedge is effected in the winding direction. The stop element preferably has a trapezoid cross-section.

Advantageously, a control lever is provided, via which the edge is bendable in the direction of the centre axis of the link. This allows for easy loosening of the edge from the locking position.

In a further embodiment of the invention the locking element is formed by a wedge-shaped slider having a radial stop surface and gliding surface arranged at a pointed angle to the wedge-shaped slider and being movably mounted to a brake lever and being pre-stressed via a spring against the inner wall of the link, wherein the at least one vaulting of the link at the same time forms a tuck bar, at whose side wall the stop surface strikes when passing the vaulting in the winding direction of the cable roller. This allows for a space-saving locking device. An additional annular bar arranged concentrically to the link is not required. In case the brake wheel glides out of the vaulting, the slider pre-stressed via the spring against the inner wall of the link glides into the vaulting preferably having a rectangular cross-section and strikes against the side wall, whereby automatic winding up is blocked.

Advantageously, the slider is connected to a control lever, via which it is moveable in the opposite direction of the spring tension. This allows for easy loosening of the locking.

In a further embodiment two slot holes are fitted in the brake lever for receiving an axis of a brake roller, which are arranged symmetrically to each other to the radial centre axis in relation to the link. Thus the brake lever may equally be used in right as well as left winding cable rollers. Depending on the winding direction, the brake roller simply needs to be fitted in the corresponding slot hole. A correspondingly formed slider is to be used whose stop surface is correspondingly arranged.

In a further embodiment of the invention the brake lever has at least one latching element, via which it can be locked with the back panel. This facilitates the assembly of the brake lever.

In a further embodiment of the invention the back panel has a hollow cylindrical centre part, which supports the brake lever and which protrudes into the link, wherein a recess is fitted laterally into the wall of the centre part for passage of the brake wheel. Thus, a stable support of the brake lever is allowed for.

BRIEF DESCRIPTION OF THE DRAWINGS

Other embodiments of the invention are shown in the remaining dependent claims. An example of the invention is shown in the drawings and is subsequently described in detail. It is shown in FIG. 1 schematic representation of a cable drum with a brake system in exploded view;

DETAILED DESCRIPTION OF THE PREFERRED EMBODIMENTS

Figure 1:
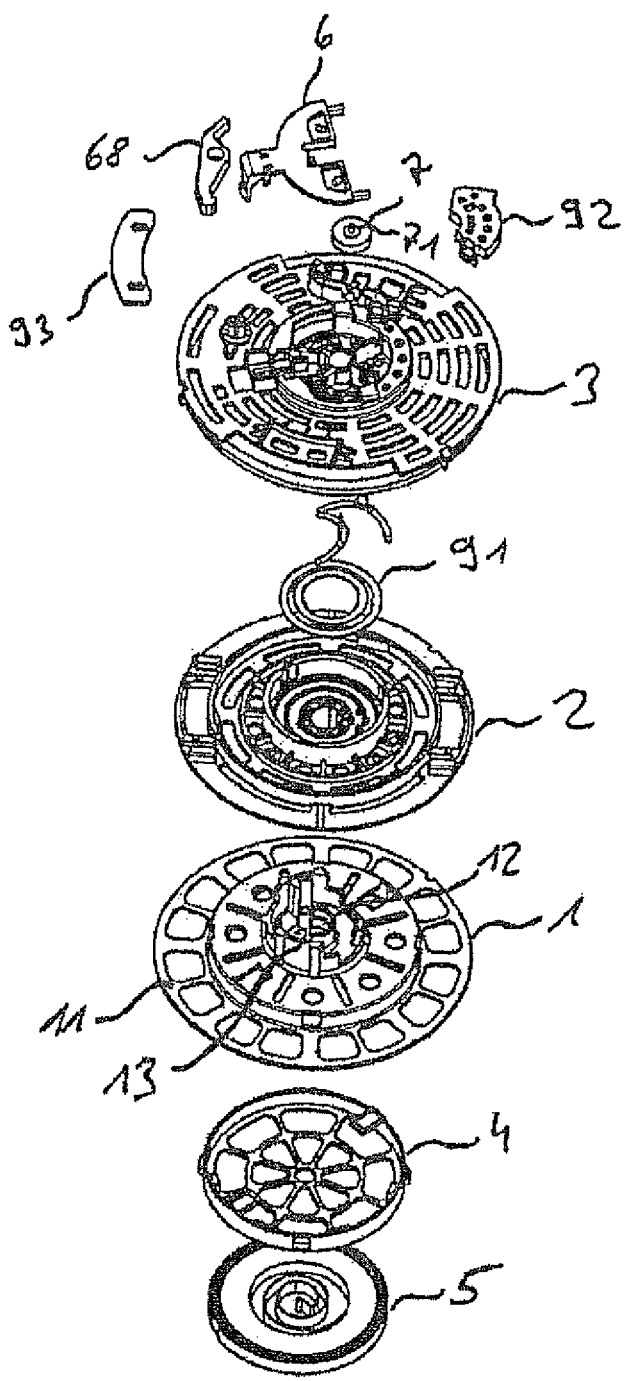
Figure 2:
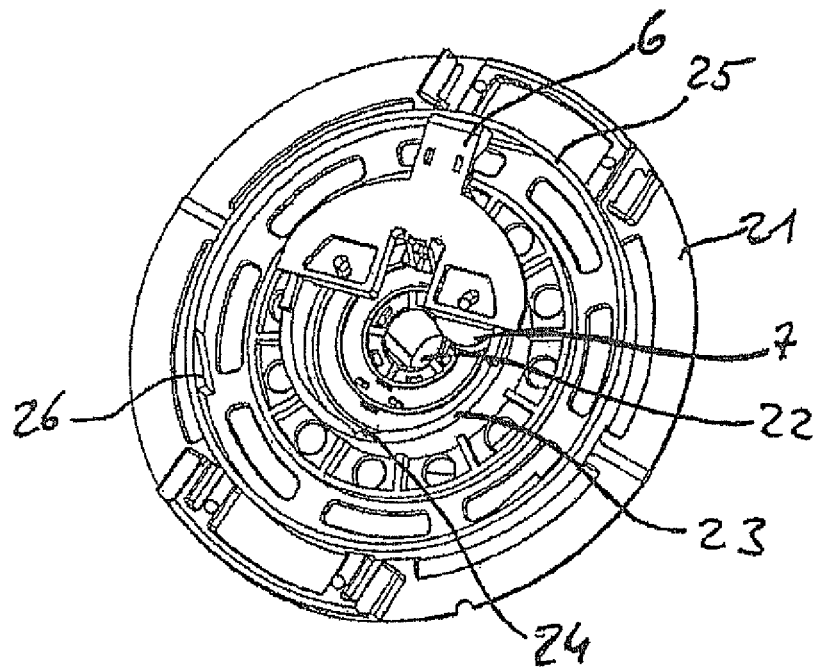
FIG. 2 representation of the inner drum part of the cable drum of FIG. 1 with an adjusted brake lever without a back panel.
Figure 3:
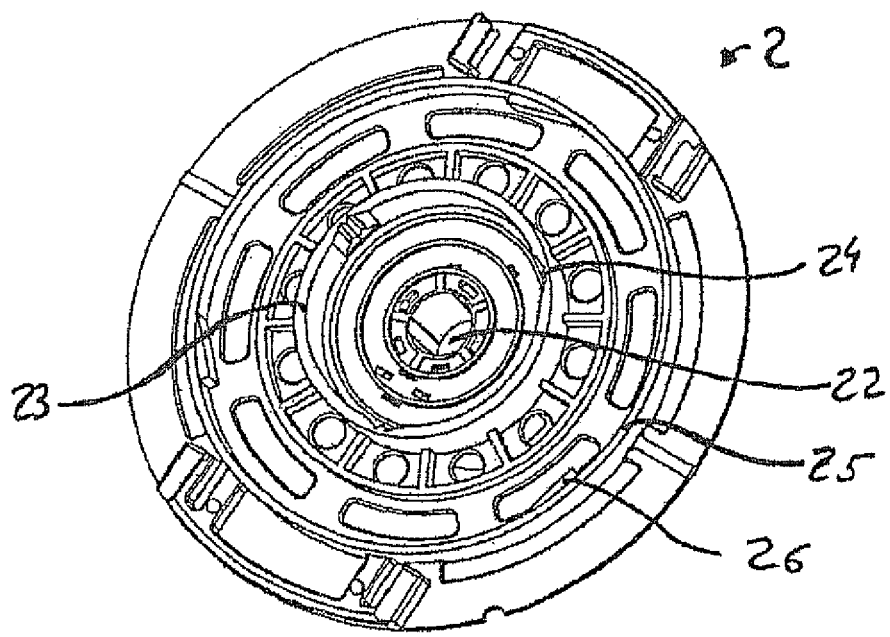
FIG. 3 representation of the inner drum part of FIG. 2 without a brake lever.
Figure 4:
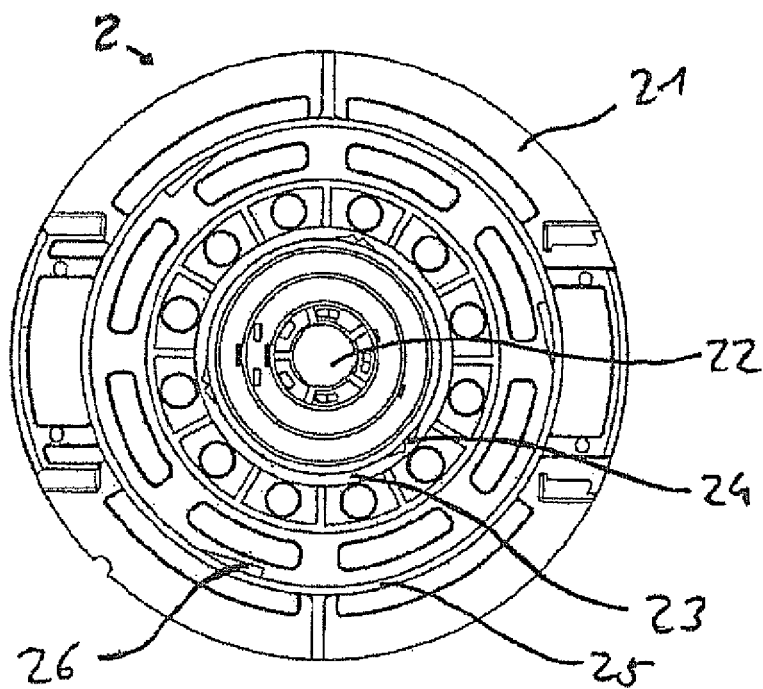
FIG. 4 representation of the inner drum part of FIG. 3 in plan view.
Figure 5:
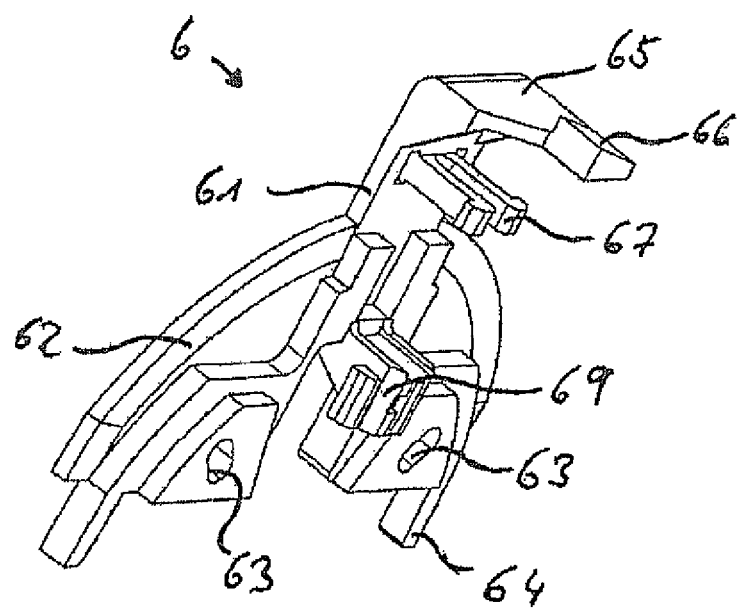
FIG. 5 spatial representation of the brake lever of the cable drum of FIG. 1.
Figure 6:
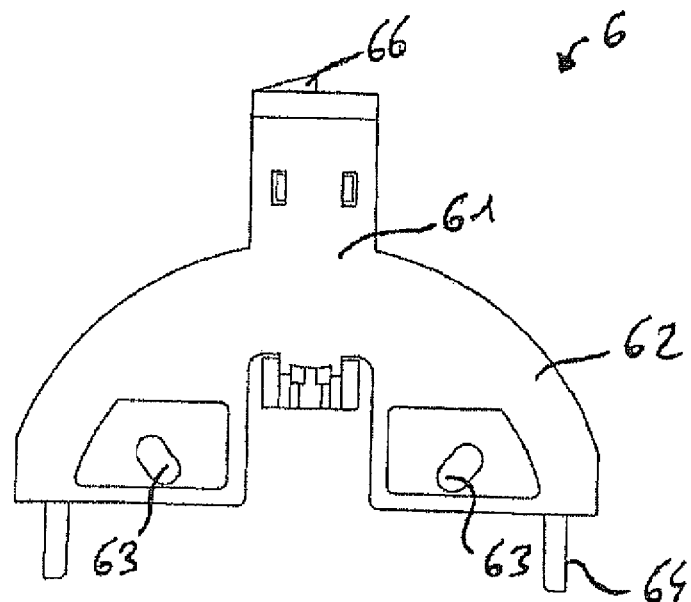
FIG. 6 representation of the brake lever of FIG. 5 in plan view.
Figure 7:
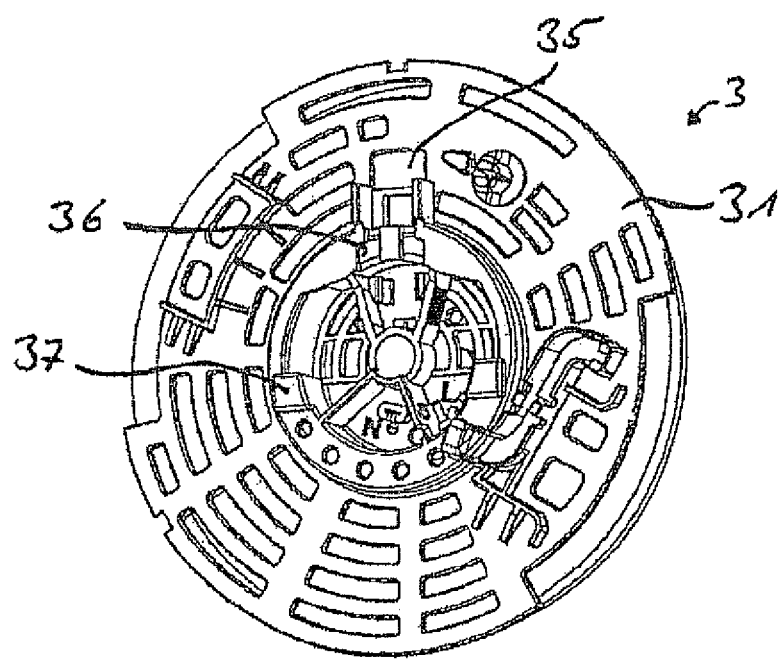
FIG. 7 representation of the back panel of the cable drum of FIG. 1 in plan view.
Figure 8:
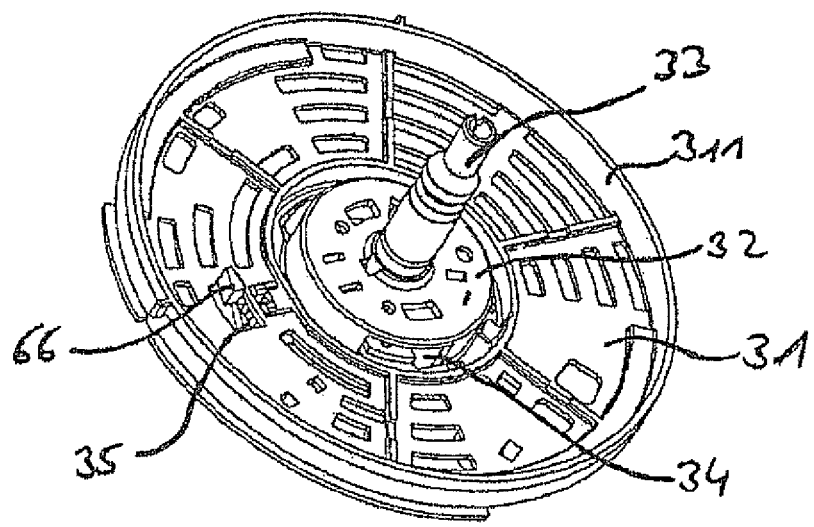
FIG. 8 representation of the back panel of FIG. 7

The cable drum according to FIG. 1 chosen as an example essentially comprises an outer drum part 1 and an inner drum part 2, which are connected via a shaft 33 with a back plate 3 as well as a spring support 4 supporting a spring 5. Spring 5 is a torsion spring and causes the cable—not shown—to automatically wind up in the known manner. At the back panel 3 there is arranged a brake lever 6 supporting a brake roll 7, which engages with the link 23 of the inner drum part 2. Furthermore, an edge 65 having a terminal 66 is connected to the brake lever 6, which abuts on an annular bar connected to the inner drum part 2, to whose inner wall wedges 26 are connected. In the inner drum part 2 sliding contacts 91 are arranged in the connection of a cable—not shown—to be wound. In order to protect sliding contacts 91, a cover 92 is attached to the back panel 3. Back panel 3 is additionally provided with a flyweight 93.

The outer drum part is formed by a circular base plate 11, which is centrally provided with an axle support 12 for supporting shaft 33 of the back panel 3. Concentrically to axle support 12 there are arranged annular bars 13. Bars 13 form the winding reel for winding up the cable—not shown.

The inner drum part 2 is formed by a circular base plate 21, which is centrally provided with a bore hole 22 for passage of the shaft 33 of the back panel 3. Concentrically to the bore hole 22 there is connected a hollow cylindrical link 23, which is provided with vaultings 24 along its inner wall. In the example the vaultings 24 are spike-shaped so that a sawtooth-shaped cross-section is formed. Concentrically to link 23 on the outside of link 23 an annular bar 25 is connected to the inner drum part 2. Along its inner wall three wedges 26 are connected to the annular bar 25 at regular intervals.

The back panel 3 is formed by a circular base plate 31, which is connected at the outside to a circular rim 311. At the centre of the back panel 3 there is arranged a hollow cylindrical centre part 32, which centrically supports a shaft 33, which forms the axis of rotation of the cable drum formed by the outer drum part 1 and the inner drum part 2. The shaft 33 is provided with a sealing plug 38, which is fitted at the end of shaft 33 and which fixes the inner drum part 2 and the outer drum part 1 on the shaft 33. Laterally a recess 34 is fitted in the hollow cylindrical centre part 32 for passage of the brake wheel 7 which is guided on the brake lever 6. Spaced from the hollow cylindrical centre part 32 a recess 35 is arranged in the base plate 31 for the passage of an edge 65 of a brake lever 6 having a terminal 66. Furthermore, there are recesses 36 for engaging the latches of brake lever 6 as well as shoes 37 for supporting the retaining bars 64 of the brake lever 6 arranged on the back panel 3.

The brake lever 6 is formed by a middle bar 61 to whose longitudinal sides one wing 62 respectively is connected oppositely. The wings 62 extend to approximately half of the middle bar 61 and project beyond the end of the middle bar 61. The wings 62 are respectively provided with an angularly arranged slot hole 63. The slot holes 63 are arranged in a manner that they are mirror symmetric to the centre axis of the middle bar 61. At the end of the wings 62 there are connected retaining bars 64 for fixing the brake lever 6 to the back panel 3. At the side, opposite wings 62, the brake lever 6 is at its end connected to an edge 65, which is provided with a terminal 66. Terminal 66 in the example has a trapezoid cross-section. Furthermore, latching elements 67 are connected to the middle bar 62 for attaching the brake lever 6 to the back panel 3.

The brake lever 6 is attached to the back panel 3 via latching elements 67, wherein the retaining bars 64 engage with the shoes 37. In a slot hole 63 of the brake lever 6 a brake wheel 7 is guided with its axis 71, wherein brake wheel 7 protrudes through the recess 34 of the centre part 33 of the back panel 3 and abuts on the inner wall of link 23 of the inner drum part. The edge 65 with the connected stop element 66 protrudes through recess 35 at the back panel 3 and abuts on the inner wall of the annular bar 25 of the inner drum part. At the back panel there is arranged a control lever 68, which abuts at one end on the edge 65 of the brake lever 6. By pivoting the control lever 68, the edge 65 is bendable in the direction of the centre axis of the link 3.

Figure 9:
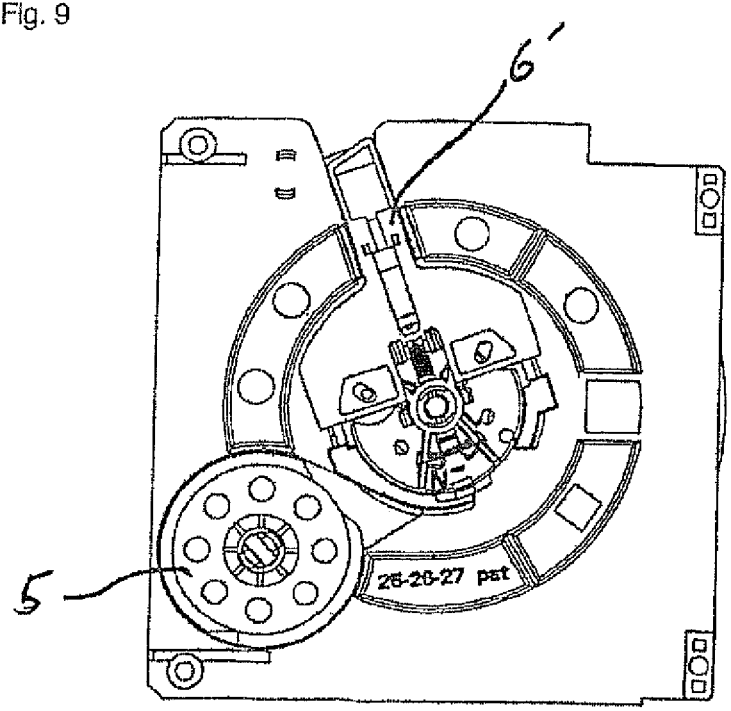
FIG. 9 schematic representation of a cable drum in a further embodiment.
Figure 10:
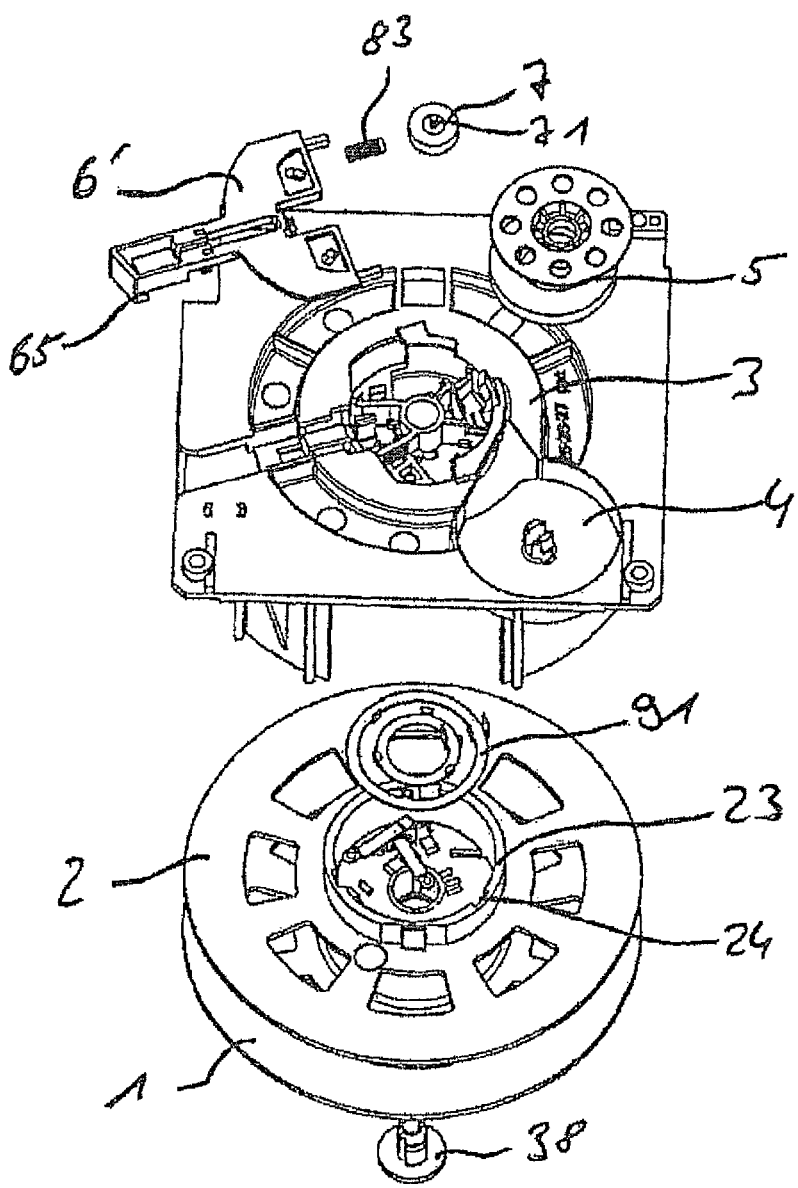
FIG. 10 representation of the cable drum of FIG. 9 in an exploded representation.
Figure 11:
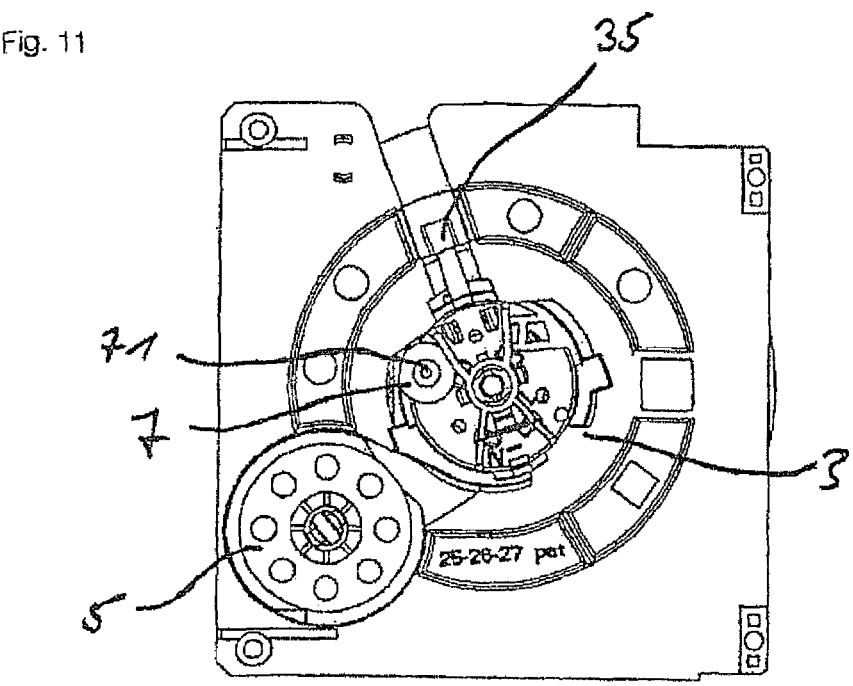
FIG. 11 representation of the cable drum of FIG. 9 after removal of the brake lever.
Figure 12:
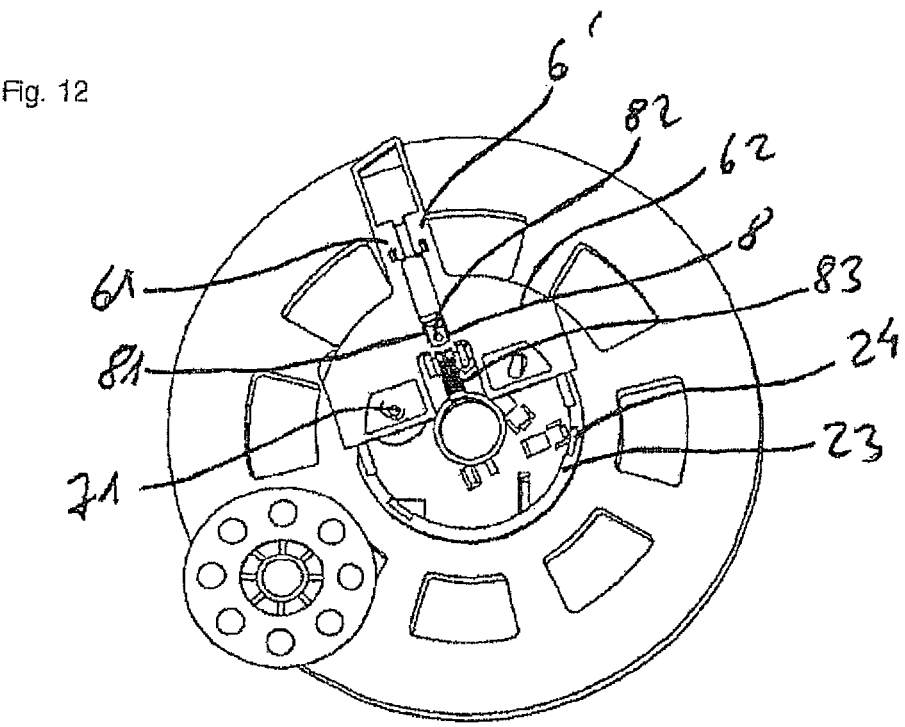
FIG. 12 representation of the back panel of the cable drum of FIG. 9 with a fitted brake lever and FIG. 13 spatial representation of the brake lever of the assembly of FIG. 12.
Figure 13:
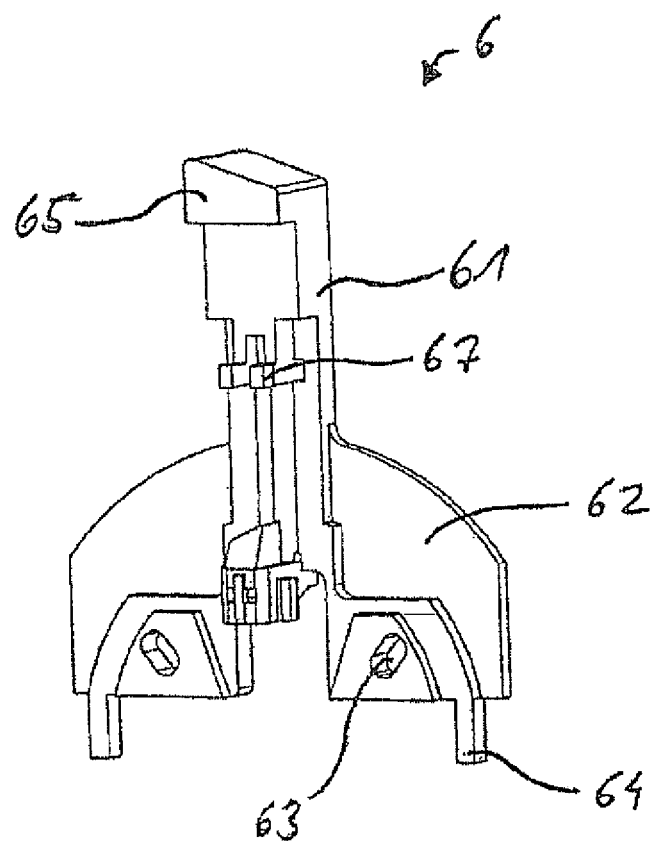

In the example according to FIG. 9 the cable drum has a modified back plate 3 as well as an eccentric spring arrangement. Due to the limited space no annular bar is provided at the inner drum part 2. There is arranged a modified brake lever 6', in which a wedge-shaped slider 8 is mounted in a moveable manner. The slider 8 has a radial stop surface 81 and a gliding surface 82 acute-angled to said stop surface 81 and is prestressed via a spring 83 against the inner wall of the link 23 of the inner drum part 2. The recesses 24 of link 23 are rectangular in this example so that by the side walls of recesses 24 defined stop surfaces are formed, against which the slider 8 strikes with its stop surface 31 when passing the recess 24 in winding direction of the cable drum. The brake lever 6' in this embodiment also has an edge 65, which however only serves the purpose of fixing the brake lever 6' to the back plate. It is to be understood that the embodiment of the brake system is not limited to cable drums with an eccentric spring arrangement.

The invention claimed is:

1. A cable drum for automatically winding up a cable, the cable drum having an inner drum part, an outer drum part and a back panel, wherein the inner drum part is connected to a hollow cylindrical link, wherein an inner wall of the hollow cylindrical link has at least one vaulting, wherein a brake lever is mounted in a radially moveable manner to the back panel and has at least one slot hole, wherein an axle of a brake wheel is guided in the at least one slot hole, wherein the brake wheel protrudes into the hollow cylindrical link and abuts on an inner wall of the hollow cylindrical link, wherein the at least one slot hole is positioned angularly in a way that the brake wheel during rotation of the hollow cylindrical link is pressed against the inner wall of the hollow cylindrical link in a winding direction of the cable drum, wherein a locking element is arranged at the brake lever downstream of the brake wheel in the winding direction of the cable drum, wherein the locking element interacts with at least one catch element arranged at the inner drum part in a manner that the locking element is only locked when passing the at least one catch element in the winding direction of the cable drum, wherein the locking element is formed by an edge arranged at the end of the brake lever, wherein the at least one catch element is formed by a wedge connected to an annular bar arranged concentrically to the hollow cylindrical link at the inner drum part, and wherein the edge has an end and is provided at the end with a terminal having an outer face facing the annular bar, the terminal being angularly shaped at the outer face facing the annular bar.

2. The cable drum according to claim 1, wherein the at least one vaulting has a rectangular cross-section.

3. The cable drum according to claim 1, wherein the at least one vaulting has an at least partially sawtooth-shaped cross-section.

4. The cable drum according to claim 1, wherein the terminal has a trapezoid cross-section.

5. The cable drum according to claim 1, wherein a control lever is connected to the edge.

6. The cable drum according to claim 1, wherein the at least one slot hole comprises first and second slot holes shaped symmetrically to each other to the radial center axis in relation to the hollow cylindrical link.

7. The cable drum according to claim 1, wherein the brake lever has at least one latching element, and wherein the brake lever can be locked with the back panel via the at least one latching element.

8. The cable drum according to claim 1, wherein the back panel has a hollow cylindrical middle part, wherein the hollow cylindrical middle part holds the brake lever and protrudes into the hollow cylindrical link, and wherein a recess is fitted laterally into the wall of the hollow cylindrical middle part for the passage of the brake wheel.

9. A cable drum for automatically winding up a cable, the cable drum having an inner drum part, an outer drum part and a back panel, wherein the inner drum part is connected to a hollow cylindrical link, wherein an inner wall of the hollow cylindrical link has at least one vaulting forming at least one catch element having a rectangular cross-section arranged at the inner drum part, wherein a brake lever is mounted in a radially moveable manner to the back panel and has at least one slot hole, wherein an axis of a brake wheel is guided in the at least one slot hole, wherein the brake wheel protrudes into the hollow cylindrical link and abuts on an inner wall of the hollow cylindrical link, wherein the at least one slot hole is positioned angularly in a way that the brake wheel during rotation of the hollow cylindrical link is pressed against the inner wall of the hollow cylindrical link in a winding direction of the cable drum, wherein a locking element is arranged at the brake lever downstream of the brake wheel in the winding direction of the cable drum, wherein the locking element interacts with the at least one catch element in a manner that the locking element is only locked when passing the at least one catch element in the winding direction of the cable drum, wherein the locking element is formed by a wedge-shaped slider having a radial stop surface, having a gliding surface acute-angled to said radial stop surface, being moveably mounted to the brake lever, and being pre-stressed via a spring against the inner wall of the hollow cylindrical link of the inner drum part, wherein the at least one catch element has a side wall, and wherein the radial stop surface strikes against the side wall of the at least one catch element when passing the at least one catch element in the winding direction of the cable drum.

10. The cable drum according to claim 9, wherein the slider is connected to a control lever, and wherein the slider is moveable via the control lever in the opposite direction of the spring tension of the spring.

\* \* \* \* \*